United States Patent [19]

Manning

[11] 3,714,088
[45] Jan. 30, 1973

[54] PROCESS FOR THE PRODUCTION OF LATEX COATED CYANAMIDE-FORMALDEHYDE MODIFIED CELLULOSIC PULP FIBERS

[75] Inventor: James H. Manning, Monroe, N.Y.

[73] Assignee: Imperial Paper Company, New York, N.Y.

[22] Filed: Feb. 24, 1971

[21] Appl. No.: 118,537

[52] U.S. Cl....................260/17.3, 8/116 R, 8/116.3, 162/157 C, 260/17.4 CL, 260/17.4 SG
[51] Int. Cl.......C08d 9/06, C08f 45/18, C08g 51/18, D06m 1/00, D21h 3/22
[58] Field of Search...................162/157 C; 260/17.4 CL, 17.4 SG, 260/17.3; 8/116.3, 116 R

[56] References Cited

UNITED STATES PATENTS

| | | | |
|---|---|---|---|
| 2,765,228 | 10/1956 | Jordan | 92/3 |
| 3,051,698 | 8/1962 | Elizer et al. | 260/212 |
| 3,380,799 | 4/1968 | Elizer et al. | 8/116.2 |
| 3,527,719 | 9/1970 | Hurwitz et al. | 260/17.4 |
| 3,359,224 | 12/1967 | Faessinger et al. | 260/17.4 |

Primary Examiner—William H. Short
Assistant Examiner—Edward Woodberry
Attorney—Robert S. Sanborn, Walt Thomas Zielinski, Jay S. Cinamon and Howard R. Goldberg

[57] ABSTRACT

A process for producing polymeric coated cellulosic fibers which comprises reacting cellulosic fibers in an aqueous alkaline medium with cyanamide and then reacting the cyanamide modified cellulose with formaldehyde to form a cyanamide-formaldehyde condensation polymer and then sorbing a latex emulsion onto said fiber. The presence of a soluble reducing sugar is necessary in either the cyanamide reaction or the formaldehyde reaction and the cyanamide reaction must precede the formaldehyde reaction.

25 Claims, No Drawings

PROCESS FOR THE PRODUCTION OF LATEX COATED CYANAMIDE-FORMALDEHYDE MODIFIED CELLULOSIC PULP FIBERS

The present invention relates to a process for the preparation of polymeric coated cellulosic fibers and, more particularly, to a process for making cellulose fibers able to sorb polymeric molecules from a solution or an emulsion in such an amount and with a sufficient degree of uniformity so that the resulting fiber may be coated or encapsulated with the sorbed polymer.

A variety of methods have been reported which will produce cellulose fibers coated with or encapsulated in synthetic polymers. One of the processes for encapsulating cellulose fibers with synthetic polymers has utilized the concept of grafting polymers to cellulose (U.S. Pat. No. 3,083,118 and U.S. Pat. No. 3,330,787), or polymerizing monomers in the presence of cellulose (U.S. Pat. No. 3,121,698). The polymerization is initiated in either of two ways: either by irradiation of cellulose in the presence of vinyl monomers or by having one of the initiator components anchored to the cellulose. Monomer-reacted cellulosic products have not met with any great commercial success for any one of the following reasons: the processes are often costly since the polymerization is carried out under conditions wherein oxygen, water, or heavy metals are absent; the polymerization process results in an ungrafted polymer which is not retained and therefore can result in fouled equipment; the grafting process is difficult to control so as to obtain the right number and correct length of polymer molecules; the polymerization process is limited in that only certain types of polymers and copolymers can be grafted due to the exacting process conditions needed for the reactions, and certain monomers are either so reactive or so toxic that shipment is both hazardous and costly.

Another means of incorporating polymers, e.g., latices, onto cellulose is through the use of a coupling agent (U.S. Pat. No. 2,563,897 and British Pat. No. 654,955). A coupling agent is a water-soluble cationic polymer which is absorbed on the cellulose fiber. The sites of positive charge then attract and hold the anionic latex so that it is retained by the cellulose. Since all of these interactions are of a physical nature, the process is influenced greatly by fiber type, fiber surface area, consistency, mixing speed, pH and rate of deposition. A further problem arises if all of the coupling agent is not absorbed onto the cellulose. If this occurs the latex flocculates in the water and is not retained by the cellulose. The resulting loss of latex and coupling agent is not only costly, but can result in fouling of equipment. Additionally, the bonding of coupling agent to fiber is by weaker physical forces instead of stronger covalent bonds. These weak physical forces allow the latex to become sheared off during pumping and wet formation and results in a weak physical product.

Still another method of encapsulating cellulose fibers with polymers is through the gaseous dispersion technique (U.S. Pat. No. 3,173,829). This process has the disadvantage of requiring specially designed equipment and the use of organic solvents.

Another means is disclosed by U.S. Pat. No. 3,380,799 which teaches that when cellulose fibers are reacted with cyanamide under aqueous alkaline conditions the fibers become substantive to anionic emulsions. The disadvantages are: (1) only 25 percent of the latex weight is taken up by the fibers, (2) the latex deposits in clumps when the cyanamide modified fibers are mixed with anionic natural or synthetic fibers, and (3) flocculation occurs.

It is an object of the present invention to provide a process for the preparation of polymer coated or encapsulated cellulosic fibers.

It is another object of the present invention to provide a process wherein the polymer coating is retained so strongly by the cellulose fibers that the polymer coated or encapsulated fibers may be formed into paper by conventional papermaking means.

It is a further object of the present invention to provide a process wherein the bonding of latex to cellulosic fibers is improved resulting in an increase in the strength and toughness of the dried product.

Other objects and advantages of the present invention will become apparent from a reading of the following detailed description of the invention.

In accordance with the foregoing objects it has been found that when cellulosic fibers are first reacted with either cyanamide or a salt of cyanamide in an aqueous alkaline medium, and then the cyanamide modified cellulosic fibers are reacted with formaldehyde or paraformaldehyde, which yields formaldehyde during the reaction, to form a cyanamide-formaldehyde condensation polymer, followed by sorbing an anionic latex emulsion onto said cyanamide-formaldehyde polymer, latex coated or encapsulated cellulosic fibers capable of retaining from 100 to 150 percent of their own weight in latex are produced. The prior art techniques conventionally result in a retention of only 25 percent by weight of latex. When the modified pulp fibers of the present invention are used in the manufacture of nonwoven materials, for example, the nonwoven has increased tensile and improved stretch without any increase in unwanted stiffness.

A soluble reducing sugar must be present during either the cyanamide reaction or during the formaldehyde reaction. The reducing sugar can be formed in situ as a first step by reacting the cellulosic fibers with hypochlorous acid to yield a soluble sugar and then reacting the soluble sugar and the remaining cellulosic fibers with the cyanamide. Alternatively, the soluble reducing sugar can be incorporated during the cyanamide reaction or the formaldehyde reaction by adding either (1) an alkali-soluble polysaccharide, e.g., starch; (2) an oligosaccharide, e.g., cellobiose, or (3) a sugar which has, or yields, aldehyde or hemiacetal groups. Still another alternative for incorporating s soluble reducing sugar during the cyanamide reaction step is to employ a cellulosic fiber containing hemicellulose which partially dissolves in the alkaline reaction medium employed in both the cyanamide reaction step and the formaldehyde reaction step.

The presence of the soluble reducing sugar results in a sugar capped cyanamide-formaldehyde polymer which enhances its ability to interact with the latex in an aqueous system. Since the soluble sugar is hydrophilic, it will seek water, and, hence, be more mobile on the surface. If the soluble sugar were not present, the cyanamide-formaldehyde polymer being hydrophobic, and preferring itself to water, would result in the formation of beads on the cellulose surface. When the cyanamide-formaldehyde polymer is deposited as beads, the latex is also deposited as beads. The latex is, thus, ineffective in bonding the fibers. When the soluble reducing sugar is employed, the soluble sugar cap on the cyanamide-formaldehyde coating results in uniform latex deposition and the sugar cap can hydrogen bond strongly with the cellulose fiber when the fiber is dried. This hydrogen bonding provides a strong anchor for the other end of the polymer.

If hypochlorous acid is used to oxidize the cellulose, as the first step in the process, it may be made up by adding an alkali metal hydroxide to an aqueous chlorine solution or it may be made up by adding a strong mineral acid, such as hydrochloric acid, to an aqueous solution of sodium or calcium hypochlorite. In order to achieve the optimum rate of oxidation and hydrolysis, the final pH of the solution of hypochlorous acid should be from about pH 5 to about pH 7 and the temperature of the reaction should be at least 35°C. The amount of hypochlorous acid should be from about 0.5 percent to about 2 percent by weight of available chlorine on cellulose.

The advantage of using the optional hypochlorous acid treatment initially is that it reacts quickly with the cellulose, thereby introducing aldehyde groups and carboxyl groups and results in the hydrolysis of the cellulose. As a result there are more aldehyde groups in the cellulose fiber, said groups probably being concentrated on the surface of the fibers. Further, there is also a marked increase in caustic solubility so that there are more soluble reducing sugars present in solution. The result is shorter chains and also a greater number of chains, and also more covalent and hydrogen bonds per unit area of cellulose fiber surface, i.e., a more strongly bound coupling agent. The product has a low nitrogen content because more of the cyanamide-formaldehyde polymer is capped on both ends with soluble sugars and these polymers are washed from the pulp. The lower nitrogen content does not have an adverse effect when used, for example, in nonwovens, since the coupling agent acts in a more effective manner due to its being held more strongly to the fiber and being principally on the surface of the fiber.

The aqueous cyanamide reaction, which must precede the formaldehyde reaction, is effective with various cellulosic fibers, either in their natural or regenerated states. Exemplary thereof are: cotton, cotton linters, wood pulps and rayon.

Cyanamide itself may be employed in the cyanamide reaction, or an alkali metal salt or an alkaline earth metal salt of cyanamide can be used. The cyanamide is most conveniently obtained from the hydrolysis of calcium cyanamide, since the calcium salt also provides the proper degree of alkalinity for reaction with the cellulose. The solution should have a pH of 9.5 and preferably from about 10.5 to about 11.5 and the temperature should be from about 5°C. to about 45°C. and typically should be run for a period of about 30 minutes. The time of the reaction, naturally, is dependent upon the temperature employed. Although the use of calcium cyanamide is preferred, sodium, potassium, lithium, barium or strontium cyanamide can be employed with equal effect. The reason that calcium cyanamide is preferred, in addition to supplying the proper degree of alkalinity, is its wide availability, low cost and high efficiency. The amount of cyanamide employed should be from about 8 percent to about 32 percent, by weight, based on the weight of the air-dried pulp.

The cyanamide modified cellulose fibers are then reacted with either formaldehyde or paraformaldehyde which yields formaldehyde upon reaction. In order to obtain a good yield and avoid unnecessary decomposition, the reaction should be carried out at a temperature from about 5°C. to about 45°C. and preferably between 25°C. and 35°C. at a pH of from about 9.5 to about 11.5 and for a period of about 30 minutes.

The molar ratio of cyanamide to formaldehyde is preferably about 1:1. Other ratios may be employed, but the condensation polymer, namely, the cyanamide-formaldehyde condensation polymer, contains one mole of cyanamide and one mole of formaldehyde. Therefore, any departure from this equimolar ratio of 1:1 only results in wasting one of the reactants.

The cellulosic fibers modified with the cyanamide-formaldehyde condensation polymer must be acidified and this may be done with any strong acid, preferably a mineral acid such as sulfuric acid, phosphoric acid, or hydrochloric acid. Hydrochloric acid is especially preferred in the process of the present invention since the use of sulfuric acid or phosphoric acids would produce insoluble salts when calcium cyanamide is employed. Acid is added until the pH is reduced to approximately 8.0 to 9.0 and the reaction is allowed to proceed for a period of about 1 ½ hours to about 24 hours. Subsequently the pH is adjusted to the acid side, namely, below 7, and preferably from about 4.0 and 5.0. After filtration and, optionally, water washing, the cellulose fibers coated with cyanamide-formaldehyde condensation polymer are slurried in water.

The pulp must only be of such a consistency as to insure efficient mixing action, and a suitable consistency is about 2.0 percent. The pH of the slurry should be between 4.0 and 6.0 and preferably about 4.5. The amount of combined nitrogen in the cyanamide-formaldehyde pulp slurry can be as little as 0.5 percent up to about 5 percent, by weight, on cellulose.

The latex emulsion, which can be polybutyl acrylate, styrene-butadiene rubber, or ethylene vinyl chloride, can conveniently be sorbed onto the cyanamide-formaldehyde modified cellulosic fibers, which are in the form of a pulp slurry, by adding the latex emulsion with solids content as received or the latex may be diluted. The sorption or deposition of the latex should be carried out at a pH of less than 7 and preferably from about 3.5 to about 4.5 and at a temperature of from about 5° C. to about 35° C. Since the latex deposition is a physical phenomenon, namely, sorption, it will be readily appreciated that the conditions may vary quite broadly dependent upon the latices employed without departing from the intent of the present process. The amount of latex added is dependent upon the intended end use of the polymeric coated fibrous cellulosic material. The cellulosic fibers can retain from about 100 percent to about 150 percent or more of their own weight of latex.

Although it is not understood with any degree of certainty it is hypothesized that the process of the present invention results in an improved product because the cyanamide-formaldehyde process results in (1) a strengthening of the fiber-coupling agent link, as a result of introducing covalent bonds, and (2) the bonding of the coupling agent to latex as the result of the coupling agent being hydrophobic and the latex also being hydrophobic.

These polymer coated or encapsulated cellulose fibers may be used in tape and sand paper backings, filters, nonwoven textile substitutes, artificial leather, wall paper, electrical and insulation papers and plastic papers. This wide variety of end products is achieved by the use of a variety of polymers or mixtures of polymers on different cellulose fiber substrates in different amounts.

The following examples will serve to illustrate the process of the present invention.

EXAMPLE 1

50 grams of a bleached softwood kraft pulp were slurried in 1 liter of water at 70° C. Sodium hypochlorite was added (7.6 ml. solution containing 4.3 percent available chlorine) and the pH of the mixture was brought to 6.2 with the addition of 18.5 percent solution of hydrochloric acid. The pulp was reacted for 2 hours while the temperature of the slurry dropped to 40° C. due to heat lost to the surroundings. As the pulp was reacting, 18 grams of technical grade calcium cyanamide was slurried in 200 ml. of water at 25° C. for 15 minutes. The slurry was filtered and the filtrate was added to the pulp at the end of its 2 hours reaction with hypochlorous acid. The pulp was mixed with the filtrate for 30 minutes, then 16.2 grams of a 37 percent solution of formaldehyde was added thereto. The mixture was stirred an additional 30 minutes. The pH was 10.5 and the temperature was between 40° and 30° C. during the reaction of the cyanamide with the formaldehyde. The pH was then adjusted to 8.7 by the addition of dilute hydrochloric acid. The mixture was stirred an additional 90 minutes. The pH was then brought to 4.5 by the addition of more hydrochloric acid solution. The pulp was recovered by filtration and was then washed with 1 liter of water.

11.5 grams, oven-dry basis, of the cyanamide-formaldehyde modified pulp were mixed in 1,800 ml. of distilled water for 10 minutes on a water bath which was maintained at a temperature of 60°–62° C. The polybutyl acrylate latex emulsion, having a solids content as received of about 40–50 percent solids, was added in an amount such that 11.5 grams of latex, on a solids basis, was added. The pH of the slurry was then adjusted slowly down to 4.0 by the addition of dilute sulfuric acid. If the sorption of latex was incomplete after 5 minutes, a 1 percent solution of aluminum sulfate was added, 2 mls. at a time, and mixed thoroughly for a few minutes while the completeness of sorption was assessed. In this instance, no alum was needed.

Handsheets were prepared by mixing 23 grams of latex coated fibers with 28 grams of mixed nylon and rayon fibers in 10 liters of water and then withdrawing portions of the slurry to physically prepare handsheets having a basis weight of approximately 33 lbs./3,000 sq. ft. The handsheets, after blotting, were heated for 5 minutes on a hot plate maintained at 105° C. and were conditioned for at least 18 hours at 73° F. and 50% RH.

The pulp was analyzed for percent nitrogen after the cyanamide and formaldehyde reactions in accordance with TAPPI Method T418-OS-61. The nonwoven properties of the handsheet, as measured by TAPPI Method T220 m-60, and the present nitrogen are listed below in Table I.

TABLE I

| | |
|---|---|
| % Nitrogen (OD pulp) | 0.77 |
| Tensile (lb/in) | 5.4 |
| % Stretch | 12.4 |
| Deposition | 100% deposition. No alum needed – good coating. |

EXAMPLE 2

Conditions were the same as in Example 1, except that the hypochlorous acid treatment was conducted at 35° C.

TABLE II

| | |
|---|---|
| % Nitrogen (OD pulp) | 0.95 |
| Tensile (lb/in) | 4.8 |
| % Stretch | 8.4 |
| Deposition | 100% deposition. 10 cc. alum needed – good coating. |

EXAMPLE 3

Conditions were the same as Example 1, except that the reactants were reduced by 80 percent of the amount employed in Example 1. Since no latex deposition occurred, handsheets were not prepared.

TABLE III

| | |
|---|---|
| % Nitrogen (OD pulp) | 0.39 |
| Tensile (lb/in) | — |
| % Stretch | — |
| Deposition | No latex |

EXAMPLE 4

Conditions were the same as in Example 2, except that the formaldehyde was added immediately after the cyanamide. Handsheets could not be prepared due to the clumping of the fibers.

TABLE IV

| | |
|---|---|
| % Nitrogen (OD pulp) | 1.88 |
| Tensile (lb/in) | — |
| % Stretch | — |
| Deposition | 100% latex deposition. Uneven coating – fibers clumped. |

EXAMPLE 5

Conditions were the same as in Example 1, except that twice as much hypochlorous acid was employed.

TABLE V

| | |
|---|---|
| % Nitrogen (OD pulp) | 0.81 |

Tensile (lb/in) 4.6
% Stretch 6.9
Deposition 100% latex deposition. No alum needed – even coating.

EXAMPLE 6

One hundred grams of a bleached hardwood sulfite pulp were slurried in 1 liter of water at 70° C. 11.7 mls. of a sodium hypochlorite solution containing 5.0 percent available chlorine was added and the pH of the mixture was brought to 6.2 with the addition of an 18.5 percent solution of hydrochloric acid. The pulp was reacted for 2 hours while the temperature of the slurry dropped to 40° C. due to heat lost to the surroundings. As the pulp was reacting 36.0 grams of technical grade calcium cyanamide was slurried at 200 mls. of water at 25° C. for 15 minutes. The slurry was filtered and the filtrate was added to the pulp at the end of 2 hours reaction with hypochlorous acid. The pulp was mixed with the filtrate for 30 minutes, and then 32.4 grams of a 37 percent solution of formaldehyde was added thereto. The mixture was then stirred an additional 30 minutes. The pH was 10.5 and the temperature was between 40° C. and 30° C. during the reaction of the cyanamide with the formaldehyde. The pH was then adjusted to 8.7 by the addition of dilute hydrochloric acid. The mixture was stirred an additional 90 minutes. The pH was then brought to 4.5 by the addition of more hydrochloric acid solution. The pulp was recovered by filtration and was then washed with 1 liter of water.

11.5 grams, oven-dry basis, of the cyanamide-formaldehyde modified pulp was mixed in 1,800 mls. of distilled water for 20 minutes on a water bath which was maintained at 60°–62° C. Then a latex emulsion, as specified below in Table VI (Expts. A—D), having a solids content as received of about 40–50 percent solids, was added in an amount such that 11.5 grams of latex, on a solids basis, was added. The pH of the slurry was then adjusted slowly down to 4.0 by the addition of dilute sulfuric acid. If the sorption of latex was incomplete after 5 minutes, a 1 percent solution of aluminum sulfite was added, 2 mls. at a time, and mixed thoroughly for a few minutes while the completeness of sorption was assessed.

The handsheets were prepared by mixing 23 grams of latex coated fibers with 28 grams of unbeaten, bleached spruce kraft pump in 10 liters of water. Portions of the slurry were withdrawn to physically prepare the handsheets. The handsheets, after blotting, were heated for 5 minutes on a hot plate maintained at 105° C. and were conditioned for at least 18 hours at 73° F. and 50% RH.

mixed in 200 mls. of water for 15 minutes followed by filtration. The calcium cyanamide filtrate was added to the pulp and was allowed to react, with mixing, for 30 minutes. Then 16.2 grams of a 37 percent solution of formaldehyde were added thereto and allowed to react with stirring for an additional 30 minutes. The pH was 10.5 and the temperature was between 40° and 30° C. during the reaction of the cyanamide with the formaldehyde. The pH was then adjusted to 8.7 by the addition of dilute hydrochloric acid. The mixture was then stirred an additional 90 minutes. The pH was then brought to 4.5 by the addition of hydrochloric acid solution. The pulp was recovered by filtration and was then washed with 1 liter of water.

11.5 grams, oven-dry basis, of the cyanamide-formaldehyde modified pulp were mixed in 1800 mls. of distilled water for 10 minutes on a water bath which was maintained at a temperature of 60°–62° C. The polybutyl acrylate latex emulsion, having a solids content as received of about 40–50 percent solids, was added in an amount such that 11.5 grams of latex, on a solids basis, were added. The pH of the slurry was then adjusted slowly down to 4.0 by the addition of dilute sulfuric acid. A 1 percent solution of aluminum sulfate was added, 2 mls. at a time, and mixed thoroughly for a few minutes until sorption was complete.

From the results shown in Table VII, when a pulp containing a normal amount of aldehydes was employed 100 percent deposition resulted, but it was lumpy and non-uniform. No soluble sugars were employed either in the cyanamide reaction or in the formaldehyde reaction.

TABLE VII

| | |
|---|---|
| % Nitrogen (OD pulp) | 2.60 |
| Tensile (lb/in) | Handsheets could not be made. |
| % Stretch | ditto |
| Deposition | 100% deposition (lumpy). 26.5 cc. of 1% alum needed. |

EXAMPLE 8

Conditions were the same as in Example 7, except that 3.23 grams of cellobiose, mixed in sufficient hot water to cause its dissolution, were added immediately before the addition of the formaldehyde. Handsheets were prepared as described in Example 1. From the results shown in Table VIII, when a pulp containing a normal amount of aldehyde groups is employed and as

TABLE VI

| Experiment | Latex | Coupling agent | Basis weight, lb./3,000 ft.² | Mullen, p.s.i. | Tensile, lb./in. | Stretch, percent | Cantilever stiffness, cm. |
|---|---|---|---|---|---|---|---|
| A | Polybutyl acrylate | Cyanamide formaldehyde | 32.3 | 22.3 | 7.87 | 8.4 | 9.7 |
| B | Soft acrylic | do | 36.4 | 27.0 | 10.2 | 10.2 | 10.0 |
| C | Styrene butadiene | do | 33.0 | 13.3 | 5.5 | 5.2 | 10.1 |
| D | Ethylene vinyl chloride | do | 33.1 | 26.5 | 10.2 | 8.0 | 10.1 |

EXAMPLE 7

50 grams of a bleached hardwood kraft pulp were slurried in 700 mls. of water for 20 minutes at 70° C. 18 grams of calcium cyanamide were wet ground and then little as 0.0094 gram moles of a soluble reducing sugar is employed, 100 percent deposition is obtained with a uniform coating, and there is no need for the use of aluminum sulfate.

TABLE VIII

| | |
|---|---|
| % Nitrogen (OD pulp) | 2.05 |
| Tensile (lb/in) | 3.8 |
| % Stretch | 4.2 |
| Deposition | 100% deposition. No alum needed – uniform coating. |

What is claimed is:

1. A process for producing polymeric coated cellulosic fibers which comprises the steps of:
   a. reacting a fibrous cellulosic pulp slurry with from about 8 percent to about 32 percent by weight, based on the weight of the air-dried pulp, of a compound selected from the group consisting of cyanamide, alkaline earth metal salts of cyanamide and alkali metal cyanamides at a temperature of from about 5°C. to about 45°C. under aqueous alkaline conditions in the presence of a soluble reducing sugar;
   b. reacting the cyanamide modified cellulosic pulp fibers of step (a) with a compound selected from the group consisting of formaldehyde and paraformaldehyde which yields formaldehyde under aqueous alkaline conditions at a temperature of from 5°C. to about 45°C. to form cyanamide-formaldehyde modified cellulosic pulp fibers;
   c. adjusting the pH to less than 7; and
   d. sorbing an anionic latex emulsion onto said cyanamide-formaldehyde modified cellulosic pulp fibers at a temperature of from about 5°C. to about 35°C.

2. The process as recited in claim 1 wherein the cellulosic fibers are reacted with calcium cyanamide.

3. The process as recited in claim 1 wherein step (a) is conducted at a pH of from about 9.5 to about 11.5.

4. The process as recited in claim 1 wherein the soluble reducing sugar is selected from the group consisting of alkali soluble polysaccharides and oligosaccharides.

5. The process as recited in claim 1 wherein step (b) is carried out at a pH of from about 9.5 to about 11.5.

6. The process as recited in claim 1 wherein the cyanamide modified cellulose is reacted with formaldehyde, the molar ratio of cyanamide to formaldehyde being approximately 1:1.

7. The process as recited in claim 1 wherein the latex is selected from the group consisting of polybutyl acrylate styrene-butadiene rubber and ethylene-vinyl chloride.

8. The process as recited in claim 1 wherein the product of step (b) has a combined nitrogen content of from about 0.5 percent to about 5.0 percent, by weight, on cellulose.

9. A process for producing polymeric coated cellulosic fibers, which comprises the steps of:
   a. reacting a fibrous cellulosic pulp slurry with from about 8 percent to about 32 percent by weight, based on the weight of the air-dried pulp, of a compound selected from the group consisting of cyanamide, alkaline earth metal salts of cyanamide and alkali metal cyanamides, at a temperature of from about 5°C. to about 45°C. under aqueous alkaline conditions;
   b. reacting the cyanamide modified cellulosic pulp fibers of step (a) with a compound selected from the group consisting of formaldehyde and paraformaldehyde which yields formaldehyde under aqueous alkaline conditions at a temperature of from about 5°C. to about 45°C. in the presence of a soluble reducing sugar to form cyanamide-formaldehyde modified cellulosic pulp fibers;
   c. adjusting the pH to less than 7; and
   d. sorbing an anionic latex emulsion onto said cyanamide-formaldehyde modified cellulosic pulp fibers at a temperature of from about 5°C. to about 35°C.

10. The process as recited in claim 9 wherein the cellulosic fibers are reacted in step (a) with calcium cyanamide.

11. The process as recited in claim 9 wherein the reaction in step (a) is conducted at a pH of from about 9.5 to about 11.5.

12. The process as recited in claim 9 wherein the soluble reducing sugar is selected from the group consisting of alkali soluble polysaccharides and oligosaccharides.

13. The process as recited in claim 9 wherein the reaction in step (b) is carried out at a pH of from about 9.5 to about 11.5.

14. The process as recited in claim 9 wherein the cyanamide modified cellulose is reacted with formaldehyde, the molar ratio of cyanamide to formaldehyde being approximately 1:1.

15. The process as recited in claim 9 wherein the latex is selected from the group consisting of polybutyl acrylate, styrene-butadiene rubber and ethylene-vinyl chloride.

16. The process as recited in claim 9 wherein the product of step (b) has a combined nitrogen content of from about 0.5 percent to about 5.0 percent, by weight, on cellulose.

17. A process for producing polymeric coated cellulosic fibers, which comprises the steps of:
   a. oxidizing a fibrous cellulosic pulp slurry with hypochlorous acid;
   b. reacting the oxidized cellulosic pulp fibers with from about 8 percent to about 32 percent by weight, based on the weight of the air-dried pulp, of a compound selected from the group consisting of cyanamide, alkaline earth metal salts of cyanamide and alkali metal cyanamides, at a temperature of from about 5°C. to about 45°C. under aqueous alkaline conditions;
   c. reacting the cyanamide modified cellulosic pulp fibers of step (b) with a compound selected from the group consisting of formaldehyde and paraformaldehyde which yields formaldehyde under aqueous alkaline conditions at a temperature of from about 5°C. to about 45°C. to form cyanamide-formaldehyde modified cellulosic pulp fibers;
   d. adjusting the pH to less than 7; and
   e. sorbing an anionic latex emulsion onto said cyanamide-formaldehyde modified cellulosic pulp fibers at a temperature of from about 5°C. to about 35°C.

18. The process as recited in claim 17 wherein the amount of available chlorine from the hypochlorous acid is from about 0.5% to about 2.0%, based on the weight of cellulose.

19. The process as recited in claim 17 wherein the hypochlorous acid oxidation is carried out at a temperature of at least 35°C. and at a pH of from about 5.0 to about 7.0.

20. The process as recited in claim 17 wherein the cellulosic fibers are reacted in step (b) with calcium cyanamide.

21. The process as recited in claim 17 wherein the reaction in step (b) is conducted at a pH of from about 9.5 to about 11.5.

22. The process as recited in claim 17 wherein the reaction in step (c) is carried out at a pH of from about 9.5 to about 11.5.

23. The process as recited in claim 17 wherein the cyanamide modified cellulose is reacted with formaldehyde, the molar ratio of cyanamide to formaldehyde being approximately 1:1.

24. The process as recited in claim 17 wherein the latex is selected from the group consisting of polybutyl acrylate, styrene-butadiene rubber and ethylene-vinyl chloride.

25. The process as recited in claim 17 wherein the product of step (c) has a combined nitrogen content of from about 0.5 percent to about 5.0 percent, by weight, on cellulose.

* * * * *